(12) United States Patent
Thetford et al.

(10) Patent No.: US 9,115,259 B2
(45) Date of Patent: Aug. 25, 2015

(54) FILLED POLY VINYL CHLORIDE COMPOSITION

(75) Inventors: Dean Thetford, Norden (GB); Patrick J. Sunderland, Rossendale (GB); Eric L. Rohr, Twinsburg, OH (US); Jatin S. Panchal, Broadview Heights, OH (US); Shelly A. Barnhart, Copley, OH (US); John D. Schofield, Bury (GB); Peter E. Bloyce, Stockport (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 369 days.

(21) Appl. No.: 13/056,809

(22) PCT Filed: Jul. 30, 2009

(86) PCT No.: PCT/US2009/052211
§ 371 (c)(1),
(2), (4) Date: Jan. 31, 2011

(87) PCT Pub. No.: WO2010/019385
PCT Pub. Date: Feb. 18, 2010

(65) Prior Publication Data
US 2011/0136953 A1   Jun. 9, 2011

Related U.S. Application Data

(60) Provisional application No. 61/088,378, filed on Aug. 13, 2008.

(51) Int. Cl.
C08K 5/10  (2006.01)
C08K 5/11  (2006.01)
C08K 5/101 (2006.01)
C08J 3/20  (2006.01)
C08L 27/06 (2006.01)
C08K 3/26  (2006.01)
C08L 67/04 (2006.01)

(52) U.S. Cl.
CPC .................. *C08J 3/203* (2013.01); *C08L 27/06* (2013.01); *C08J 2327/06* (2013.01); *C08K 3/26* (2013.01); *C08L 67/04* (2013.01)

(58) Field of Classification Search
CPC ............ C08J 3/203; C08K 3/26; C08L 27/06; C08L 67/04
USPC ....................................................... 524/310
See application file for complete search history.

(56) References Cited

U.S. PATENT DOCUMENTS 2,713,563 A * 7/1955 Kuhn ............................. 523/342
2009/0111915 A1* 4/2009 Lavallee et al. ................. 524/35

FOREIGN PATENT DOCUMENTS

| EP | 0253524 A2 | 1/1988 |
| EP | 0358315 A2 | 3/1990 |
| JP | 62119238 A | 5/1987 |
| JP | 2006273981 A | 10/2006 |

* cited by examiner

*Primary Examiner* — David W Wu
*Assistant Examiner* — Marie Reddick
(74) *Attorney, Agent, or Firm* — Samuel B. Laferty

(57) ABSTRACT

The invention relates to a composition containing a particulate solid, plastic material (such as polyvinyl chloride), and a dispersant/agent comprising an oligomer from polymerizing a $C_{7-20}$ hydroxycarboxylic acid optionally with a $C_{1-6}$ hydroxycarboxylic acid or its corresponding lactone form.

9 Claims, No Drawings

FILLED POLY VINYL CHLORIDE COMPOSITION

CROSS REFERENCE TO RELATED APPLICATION

This application claims priority from PCT Application Serial No. PCT/US2009/052211 filed on Jul. 30, 2009, which claims the benefit of U.S. Provisional Application No. 61/088,378 filed on Aug. 13, 2008.

FIELD OF INVENTION

The invention relates to the use of a class of dispersants in finished polymer from vinyl chloride (PVC) articles which may optionally have filler present. Such articles as sidings, blinds (vertical, Venetian, roller, etc.), pipe, housing for machines and electrical devices, automotive components, etc., are manufactured by usual known methods (e.g., Extrusion, calendering, injection moulding, etc).

BACKGROUND OF THE INVENTION

In plastic materials such as polyvinyl chloride, the use of fillers is known. The presence of the fillers is known as a means of imparting dimensional rigidity, coloring, weathering, and lower costs of final plastic materials. However, advantages of fillers are balanced against at least one disadvantage including (i) slower processing during manufacture of the plastic materials, and (ii) diminished impact strength.

In order to overcome a number of the difficulties highlighted above, attempts have been made to employ coupling agents or other additives to the filler to promote compatibility with plastic materials.

U.S. Pat. No. 3,778,287 discloses structures of poly 12-hydroxystearic acids (PHS) and polyricinoleic acids (PRA) and their use in aliphatic/aromatic ink/paint systems as dispersants for organic and inorganic pigments.

Application and use of processing additives containing repeat units from hydroxycarboxylic acids are suggested for particulate solids by U.S. Pat. No. 4,797,440 in general thermoplastics. PVC is mentioned (column 4) and exemplified in Example 37 of Table 9 of the patent (Column 11). The particular Example 37 includes a phthalocyanine blue (0.2 g/100 g PVC) and titanium dioxide (2 g/100 g PVC) and exemplifies the increased colour strength generated by use of these dispersants. Advantages (end of column 1 and start of column 2) attributed to the use of the processing additive were fewer specks and better surface finish. The polymers were primarily polyolefins. Interestingly, chlorinated PVC and urethanes are not specifically mentioned as operative thermoplastics.

Trying to get the PHS or PRA dispersant onto filler (filler treatment) is covered by GB 2 056 461 where an emulsion is made of the dispersant and then applied to the pigment/filler surface. Again, examples of using the treated pigment in a PVC formulation are given (Example 45-47 bottom of page 7). Again, colour strength and reduction of speck levels are the major improvements from using such dispersants.

Formulating polymers from vinyl chloride for melt processing presents numerous issues and a need to balance processing properties and final properties. Polymers of higher molecular weight (high inherent viscosity (IV)) typically have better properties such as strength and impact resistance, but melt process at slower rates than lower molecular weight polymers of the same composition. The addition of Impact modifiers to polymers from vinyl chloride provide important impact resistance to molded articles but also slows melt processing rates. Particulate fillers can be added but also decrease melt processing rates. Thermal degradation of vinyl chloride based polymers accelerates as degradation products like HCl are produced from past thermal exposure of the polymer. Therefore, it is desirable to minimize the melt temperature and thermal exposure time of polymers from vinyl chloride. The thermal exposure both imparts a yellow color to the polymer and lowers the molecular weight, of the polymer. Contradictory to the desire for short thermal history is the necessity to fully melt and fuse the polymers from vinyl chloride during melt processing to achieve optimal impact resistance and strength in the final article.

PHS/CAP and PRA/CAP polymers (CAP stands for caprolactone) have been disclosed as intermediates to PEI dispersants in U.S. Pat. Nos. 5,700,395 and 6,787,900. They have not generally been claimed as dispersants themselves except in US Publication 20060189502A1 for Dispersions to Make Electronic Devices, such as electrical capacitors containing electrically conductive metal layers and electrically insulative layers laid downed and then fired to form a ceramic composite.

It would be desirable to have a class of dispersants in filled poly vinyl chloride compositions, to dispersions containing such dispersants together with a particulate solid in PVC, and compositions comprising a particulate solid, PVC and a dispersant which require a shorter melt processing time. It would also be desirable to have a dispersant to use in forming finished PVC articles, which may optionally have filler present, that promotes fusion of the PVC particles and thereby enhances throughput through the PVC processing equipment.

SUMMARY OF THE INVENTION

In one embodiment, the invention provides a composition comprising a particulate solid, a plastic material (such as a vinyl chloride polymer) and a compound of Formula (1); and salts thereof:

$$H-[RC(=O)]_p-[A]_m-[B]_n-OM \qquad \text{Formula (1)}$$

wherein
R is C1-36 hydrocarbylene group;
A is an oxy ($C_{7-20}$) alk(en)ylene carbonyl chain;
B is an optionally substituted oxy ($C_{1-6}$) alkylene carbonyl chain;
p is 0 or 1, m is 0-10, n is 0-10, and n+m is from 1 to 20, more desirably from 3 to 20;
M is H, alkali or alkaline earth metal, amine, alkanolamine or quaternary ammonium salt.

Formula 1a is identical to Formula 1 except n is defined as being from 1 to 10. In one embodiment of Formula 1a, m is also defined as being from 1 to 10, thus requiring the Formula 1a in that embodiment to be a copolymer of units of A and B. In the latter scenario n+m is from 2 to 20, more desirably from 3 to 20.

In one embodiment, the invention provides a composition comprising a plastic material (such as a vinyl chloride polymer) and a compound (may also be referred to as a dispersant) according to Formula 1 or 1a obtained/obtainable by reacting polymerizing one or more hydroxycarboxylic acids or lactones into an oligomer. A more detailed description of polymerizing hydroxycarboxylic acids or lactones is given in U.S. Pat. Nos. 4,797,440 and 6,787,600.

In one embodiment, the invention provides a composition comprising a particulate solid, a plastic material (such as a vinyl chloride polymer), and a dispersant of Formula 1 or 1a.

In one embodiment, the invention provides a method of filling a plastic material (such as a vinyl chloride polymer), comprising supplying to the plastic material a particulate solid and a compound of Formula 1 or 1a.

In one embodiment, the invention provides for the use of a compound selected from the group consisting of Formula 1 or 1a to increase melt flow rates during a melt processing step of composition of polymer from vinyl chloride by using the dispersant of Formula (1) or (1a).

DETAILED DESCRIPTION OF THE INVENTION

The present invention provides a composition as disclosed herein above.

In one embodiment, the compound of Formula 1 or 1a is dispersed within the composition. In one embodiment, the compound of Formula 1 or 1a is uniformly dispersed within the composition.

To cheapen PVC plastic materials, manufacturers are filling PVC with various low cost fillers such as calcium carbonate. However, only low levels of filler can be used without affecting final physical properties of these finished PVC articles such as impact resistance. Also putting fillers into the PVC composition can slow down processing times and also increase fusion times. Addition of certain dispersants to filled PVC compositions allow easier processing therefore can increase filler loading. Typically, rigid PVC processing is improved through the use of a suitable lubricant package.

The novel technology acts at the filler/PVC matrix interface, and as such should be used in addition to lubrication. By reducing the interfacial energy at the filler-PVC boundary, resistance to polymer flow in the compounder is reduced and processing speeds are significantly increased. Also, presumably because of chain entanglement, a mechanical coupling effect may occur in the filled PVC matrix on cooling. This may give useful improvements in certain mechanical properties. The benefits of these new processing aids have so far been demonstrated in Calcium Carbonate filled PVC, but it is hoped that examples with other fillers or pigments will also be tested. These dispersants speed up the breakdown of the particulate solid in PVC to molten polymer and therefore speed up the fusion time of the primary particles of PVC which is observed by the decreased processing time. These dispersants also help to lower processing time when incorporating wastage/allowing wastage incorporation into articles/also helping to cut wastage. The dispersants as well as reducing fusion time while being able to increase filler loading and increasing processing speeds have shown they increase mechanical properties such as tensile strength and flexural modulus of rigid PVC articles and do not affect mechanical properties such as VICAT and impact strength. They can also be used to improve surface finish of the final PVC articles to higher gloss levels.

The products can be used to disperse inorganic pigments and fillers such as calcium carbonate, TiO2, iron oxide and ATM in PVC increasing throughput rates, allowing higher filler loading, decreasing fusion times, and improve surface finish of articles.

It has been found that certain polymeric agents show excellent ability to disperse a particulate solid in vinyl chloride polymer. Thus according to the present invention there is provided a finished article comprising a vinyl chloride polymer, optionally a filler and a compound of Formula (1) and salts thereof:

$$H-[RC(=O)]_p\text{-}[A]_m\text{-}[B]_n OM \quad \text{Formula (1)}$$

wherein
R is C1-36 hydrocarbylene group;
A is an optionally branched oxy ($C_{7-20}$) alk(en)ylene carbonyl chain;
B is an optionally substituted oxy ($C_{1-6}$) alkylene carbonyl chain;
p is 0 or 1, m is 0-10 and n is 0-10;
M is H, alkali or alkaline earth metal, amine, alkanolamine or quaternary ammonium salt. In one embodiment, the OM species is a salt and might be represented in more detail by $O^-M^+$. In one embodiment, the number average molecular weight of $RC(=O)\text{-}[A]_m\text{-}[B]_n$ is between 800 and 3000.

In one embodiment, the hydroxyl carboxylic acid from which A is derivable is an optionally branched hydroxy-$C_{7-20}$-alkenylene carboxylic acid (e.g., ricinoleic acid) and/or optionally branched hydroxy-$C_{7-20}$ alkylene carboxylic acid (e.g., 12-hydroxystearic acid), i.e., the "(en)" means unsaturation is optionally present in the alk(en)ylene. In one embodiment, the number of carbon atoms in the alk(en)ylene is 8 to 20. The numbers 7-20 or 8-20 refer to the number of carbons only in the alk(en)ylene portion of the oxyalky(en)ylene carbonyl. Specific examples of suitable hydroxy carboxylic acids are ricinoleic acid, 12-hydroxystearic acid, 12-hydroxy dodecanoic acid, 5-hydroxy dodecanoic acid, 5-hydroxy decanoic acid, 4-hydroxy decanoic acid and 10-hydroxy undecanoic acid.

In one embodiment, the hydroxy carboxylic acid from which B is derivable is bydroxy-$C_{1-6}$-alkylene carboxylic acid (optionally branched) or a lactone thereof, and in another embodiment it is $C_{2-6}$. As above, the $C_{1-6}$ or $C_{2-6}$ refers to the number of carbons in the alkylene potion of the oxyalkylene carbonyl. Specific examples of suitable hydroxy carboxylic acids include glycolic acid, lactic acid, 5-hydroxy valeric acid and 6-hydroxy caproic acid. Specific examples of suitable lactones include ε-caprolactone, δ-valerolactone, β-propiolactone, alkyl substituted caprolactones such as 7-methylcaprolactone, 4-methylcaprolactone, and 3-methylcaprolactone.

Typically, the R—CO— group of Formula 1 is preferably free from amino groups and is derived from linear or branched $C_{1-25}$ fatty acids (preferred $C_{8-20}$) such as oleic, palmitic, stearic, erucic, behenic, lauric, 2-ethylhexanoic, 9,11- and 9,12-linoleic, 9,12,15-linolenic acids and abietic acid and is optionally substituted by hydroxy, $C_{1-4}$-alkoxy, or halogen. U.S. Pat. No. 6,787,600, column 5, line 40-60, provides further examples of fatty acids which can be used to form the R—CO— group of Formula 1 or 1a. As used herein, the term "hydrocarbyl" means that the group being described has predominantly hydrocarbon character. These include groups that are purely hydrocarbon in nature such as alkyl and aromatic, that is, they contain only carbon and hydrogen. They may also include groups containing substituents or atoms to the extent do not alter the predominantly hydrocarbon character of the group. Such substituents may include halo-, alkoxy-, nitro-, etc. In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen. Hydrocarbylene is the divalent form of hydrocarbyl.

Examples of suitable metals represented by M include lithium, sodium, potassium, calcium, magnesium and zinc. Examples of suitable amines and alkanolamines represented by M include ammonia, butylamine, dibutylamine, diethanolamine, triethanolamine and 2-amino-2-methyl-1-propanol.

The compound of formula 1 or 1a may be added to the vinyl chloride and/or particulate solid by various means/processes and in various sequences. For example, the compounds of formula 1 or 1a may be separately added to the vinyl chloride polymer, to the particulates, or to a third component (e.g., another additive, or a carrier, such as silica or wax). The above components can be wet, dry, or melt blended with the other components in various sequences and then homogenized sequentially, homogenized in a single step, or combinations thereof.

The compositions of the invention can be processed by a variety of techniques including melt processing such as molding, extrusion, calendering, thermoforming, compression molding and the like. The useful articles to be formed include films, molded sheets, trays, siding, shutters, vents, louver slats, plastic coated metal parts, shrouds for fans, blinds (vertical, Venetian, roller, etc.), appliance parts and covers, electrical outlets, business machine parts and housing, piping, telecommunication equipment, automotive components, bottles, etc, According to another embodiment there is provided a composition comprising a vinyl chloride polymer, optionally a filler and a compound of Formula (1a) and salts thereof;

H—[RC(=O)]$_p$-[A]$_m$—[B]$_n$—OM     Formula (1a)

wherein

R, A, B, VI and m are the same as represented previously; and p is 0 or 1, n is 1-10, and in one embodiment m is 1-10. In one embodiment of Formula (1a) n+m is from 2 to 20, more desirably from 3 to 20.

According to one embodiment, there is provided a composition comprising a filler and a compound of Formula (1a) in which the filler has been surface treated with the compound by any of the known methods.

According to another embodiment, there is provided a composition comprising a vinyl chloride polymer and a compound of Formula 1 or 1a. This may be manufactured as a masterbatch by any of the known processing methods or directly during the manufacture of the PVC polymer particles.

In one embodiment, the plastic material includes a vinyl chloride polymer. The vinyl chloride polymer may be a homopolymer or a copolymer.

In one embodiment, the vinyl chloride polymer includes a homopolymer.

In one embodiment, the vinyl chloride polymer includes a copolymer.

When a vinyl chloride copolymer is employed as the plastic material in the invention, the copolymer may be formed by copolymerising vinyl chloride with one or more comonomers. Examples of suitable comonomers include vinyl esters such as vinyl acetate, alkyl (alk)acrylates (where "(alk)" indicates an optional alkyl group of 1 to 4 carbon atoms on the beta carbon of the carbon-carbon double bond, e.g., methaerylate) and the alkyl is from 1 to 20 carbon atoms, such as ethyl acrylate, butyl acrylate, methyl methaerylate; acrylonitrile; unsaturated olefins, such as ethylene, propylene, 1-butene, 1-hexene, and isobutylene; vinylidene chloride; styrene and its substituted derivatives; vinyl ethers, and dialkyl vinyl phosphonates (such as bis(betachloroethyl)vinylphosphonate). Crosslinking comonomers, as known to the art, could be added but in most embodiments are absent. In one embodiment, the vinyl chloride polymer can be a post polymerization chlorinated PVC, also known as chlorinated poly(vinyl chloride) (CPVC). Chlorinated vinyl chloride polymers are distinguished from their non-chlorinated counterparts by their total bound chlorine content. Chlorinated vinyl chloride polymers typically have from 57 to 78 wt. %, in other embodiments from 60 or 63 to 69 or 70 wt. %, and in most commercial products from 60 to 68 wt. % bound chlorine. In one embodiment, the vinyl chloride polymer is at least 50 wt. % repeating units derived from vinyl chloride monomers, in another embodiment the vinyl chloride polymer is at least 70 or 80 wt. % repeat units from polymerizing (derived from) vinyl chlorine monomers and more preferably 100% (e.g., a vinyl chloride homopolymer).

In one embodiment, the invention provides a composition comprising a particulate solid, a plastic material (such as a vinyl chloride polymer) and a compound of Formula 1 or 1a derived from polymerizing one or more hydroxycarboxylic acids or a lactone thereof.

In one embodiment, n is from 1 to 10.

In one embodiment m is from 1 to 10.

In one embodiment, n and m are each independently from 1 to 10 and n+m is from 2 to 20.

In one embodiment, the invention provides a composition comprising a plastic material (such as a vinyl chloride polymer), a compound of Formula 1 or 1a, and optionally filler and/or pigment. In one embodiment, the invention provides a composition comprising 90 to 99.95 wt % of a plastic material (such as a vinyl chloride polymer), 0.05 to 5 wt % of a compound of Formula 1 or 1a, and optionally filler and/or pigment.

In one embodiment, the composition is substantially free of pigment and in another embodiment the composition is substantially free of both pigment and filler. For the purposes of this application, "substantially free of" will be defined as less than 1 wt. % based on the thermoplastic resin (e.g., vinyl chloride polymer), more desirably less than 0.1 wt. % and preferably less than 0.01 or 0.001 wt. %. In one embodiment, the particulate filler is present in amounts of at least 5 or 10 parts by weight per 100 parts by weight of the thermoplastic resin (e.g., vinyl chloride polymer), in another embodiment, the particulate filler is present at a level of at least 20 parts by weight and in a third embodiment, it is present at a level of at least 30 parts by weight. While literature sources suggest filler loadings up to 300 parts/100 parts by weight of thermoplastic resin, generally where a high durability vinyl chloride polymer composition is desired the maximum amount, of particulate filler is 100 parts per 100 parts by weight of vinyl chloride polymer.

In one embodiment, the invention provides a composition comprising 97 to 99.95 wt. % of a plastic material (such as a vinyl chloride polymer), and 0.05 to 3 wt. % of a compound of Formula (1).

In one embodiment, the invention provides a composition comprising a particulate solid, a plastic material (such as a vinyl chloride polymer) and in one embodiment, the invention provides a composition comprising 1 to 50 wt. % of a particulate solid, 45 to 98.99 wt. % of a plastic material (such as a vinyl chloride polymer), and 0.01 to 5 wt. % of a compound of Formula (1).

In one embodiment, the invention provides a composition comprising 1 to 50 wt. % of a particulate solid, 47 to 98.99 wt. % of a plastic material (such as a vinyl chloride polymer), and 0.01 to 3 wt. % of a compound of Formula (1).

The particulate solid may be any solid material which is used with polymeric materials and specifically includes such solids used as fillers. The solids may be in the form of a granular material or in the form of a powder, often a blown powder. Examples include calcium carbonate, calcium sulphate, calcium oxide, barium sulphate, barium carbonate, magnesium oxide, magnesium hydroxide, iron oxide, calcium and magnesium silicates, aluminosilicates, kaolin, mica, talc, chalk, zinc, aluminium, aluminium trihydroxide, glass fibres, refractory fibres, carbon black including reinforcing and non-reinforcing carbon black, alumina, quartz, wood flour, powdered paper/fibre, asbestos, crysatille, anthophylite, crocidolite, wollastonite, attapulgite and the like, particulate ceramic materials such as alumina, silica, zirconia, titania, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g., barium ferrites. Preferred are calcium carbonate, woodflour, and other cellulose materials.

In one embodiment, the particulate solid (or filler) is selected from the group consisting of calcium carbonate, magnesium carbonate, magnesium hydroxide, alumina trihydrate, silica, alumina silicate, magnesium silicate, magnesium oxide, iron oxide, diatomaceous earth, hydrated silicates, calcium oxide, mica, talc, kaolin, and bentonite. In one embodiment, the inorganic particulate includes calcium carbonate.

In one embodiment, the particulate solid is pre-coated with the compound of Formula (1).

Optionally, the compositions of the invention further comprise other conventional additives for vinyl chloride compositions in conventional amounts, such as: plasticizers, flow enhancing agents, flame retardants, lubricants (both internal and external), impact modifiers, blowing agents, or stabilizers.

The amount of plasticizer is disclosed in U.S. Pat. No. 5,210,140, column 7, lines 6-15. The flow enhancing additives can be α-methylstyrene polymers, polypropylene, imidized PMMA, and low acrylonitrile containing SAN copolymers, etc.

The flame retarding additives which may be used in the compositions comprise a large number of chemical compounds which are well known to those skilled in the art. In general, they contain chemical elements which are used because of their flame-retarding capacity, for example bromine, chlorine, antimony, phosphorus and nitrogen. Preferably, the flame-retarding additives are inorganic compounds which are normally effective in combination with halogenated organic compounds. These are materials such as antimony compounds (e.g., antimony trioxide), zinc compounds (e.g., zinc borate), antimony-zinc complex compounds (e.g., Oncor 75RA, a product of NL Industries, Inc.), iron compounds (e.g., ferric oxide), and other metal-based inorganic compounds which perform well with antimony oxide (e.g., Ongard 2, a product of NL Industries, Inc.). When using a flame retardant, the amount should be sufficient to yield a blend having a UL 94 rating of V-1 or better using test bars 0.060 inch thick.

The vinyl chloride polymer blend may contain effective amounts each preferably ranging from 0.5 to about 15 parts by weight of various lubricants and stabilizers known to the art as well as to the literature. For example, various external lubricants such as stearic acid, oxidized polyethylene, polypropylene, paraffin wax, and metallic salts of fatty esters including mixtures and the like can be utilized. Stabilizers for vinyl chloride polymer include barium/cadmium/zinc compounds, and various organo-tins, for example, methyl, -butyl, -octyltin carboxylates, mercapto-carboxylates, mercaptides, glycolates, thioglycolates and the like. Specific examples include dibutyltin-S—S'-bis-(isooctylmercaptoacetate), dibutyltin dilaurate, with organo tin diisooctyl thioglycolates being preferred. Secondary stabilizers may be included for example phosphites, and metal salts of phosphoric acid. Specific examples of salts include water-soluble, alkali metal phosphate salts, disodium hydrogen phosphate, orthophosphates such as mono-di and tri-orthophosphates of said alkali metals, alkali metal polyphosphates, -tetrapolyphosphates and -metaphosphates, and the like. Typical levels of secondary stabilizers, when present, range from about 0.1 wt. parts to about 7.0 wt. parts per 100 wt. parts halogenated polymers. In addition, antioxidants may also be incorporated such as phenolics, BHT, BHA, various hindered phenols, and various inhibitors such as substituted benzophenones can be utilized to provide oxidation resistance, U.V. resistance, etc.

Inasmuch as high impact values are often desired, additional impact modifiers may be incorporated, as noted above, and are known to the art as well as to the literature. For example, various impact modifiers can be utilized as set forth in The Encyclopedia of PVC, Volume 2, Chapter 12, Marcel Dekker, Inc., New York, 1977, which is incorporated herein by reference. Examples of commercially available impact modifiers include acrylonitrile-butadiene-styrene (ABS) polymers, chlorinated polyethylenes, graft copolymers of acrylic rubbers, the various poly(ethylene-co-vinyl acetates), styrene-butadiene-styrene block copolymers, graft copolymers of methyl methylacrylate, butadiene, styrene (MBS), including mixtures thereof.

Preferred impact modifiers include ABS, MBS, and chlorinated polyethylene. Regardless of the exact type of impact modifier utilized, the amounts thereof can vary depending upon the desired impact strength as typically measured by an Izod impact test, (ASTM D256). The levels of impact modifier can vary from about 1 to about 50 parts by weight, and more preferably from about 5 to about 20 parts by weight based upon 100 parts by weight of said vinyl chloride polymer. Most preferably impact modifier is present at from 5 to 12 weight parts per 100 weight parts of vinyl chloride polymer. Accordingly, the blends of the present invention have the capacity to be impact-modified to achieve notched Izod values generally in excess of 100 N·m/m (of notch), desirably in excess of 200 N.multidot.m/in and preferredly in excess of 230 N·m/m, The vinyl chloride polymer composition can be prepared along with the various additives for instance in a high speed powder mixing device, a Banbury mixer or the like, and then fused on a two-roll mill and cubed. The compound in a fused, cubed state can be subsequently calendared, extruded, or injection molded or processed by any suitable melt processing means. The vinyl chloride polymers can also be mixed with the various additives in a high intensity mixer such as a Henschel mixer and then processed on an extruder into pellets or directly into a finished article as for instance using a twin screw extruder. In general, any conventional means of compounding such as a Banbury mixer, two-roll mill, Henschel mixer, ribbon blender, compounding extruder, injection molding machine and the like can be used to prepare the compounds of this invention.

The following examples provide illustrations of the invention. These examples are non exhaustive and are not intended to limit the scope of the invention.

EXAMPLES

Example 1

Caprolactone (38.4 parts), ricinoleic acid (361.7 parts) and zirconium butoxide catalyst (0.51 parts) were added to a 500 ml round bottomed flask under a nitrogen atmosphere. The mixture was stirred at 172° C. for 5 hours. An amber liquid was obtained (441 parts) with an acid value of 33.4 mg KOH/g. This is Dispersant 1.

Example 2-14

The following examples in Table 1 were prepared by the general procedure mentioned for Example 1 but using different amounts and sometimes different lactones, hydroxycarboxylic acids, and catalysts.

The dispersants (Examples 3, 5, 6, 11 and 12) is then tested by addition to the above control formulations. Level of addition was set at 2% dispersant/agent on weight of the filler. Therefore, for the formulation containing 30 parts of Calcium Carbonate, 0.6 parts of dispersant is used. Each test formulation is then run through the extruder using the same barrel temperatures but the rpm is increased until the die pressure is matched and constant to the original control formulation die pressure. The average torque reading and throughput rates of material are recorded.

TABLE 1

| Example | Caprolactone Amount (Parts) | Ricinoleic Acid Amount (Parts) | 12-HSA Amount (Parts) | Catalyst Amount (Parts) | Dispersant Amount (Parts) | Physical Form | Acid Value mg KOH/g |
|---|---|---|---|---|---|---|---|
| Dispersant 2 | 216.7 | 283.3 | 0 | 0.54 | 448 | Amber Liquid | 34.4 |
| Dispersant 3 | 58.6 | 459.8 | 0 | 1.5 | 486 | Amber liquid | 51 |
| Dispersant 4 | 138.4 | 361.6 | 0 | 0.84 | 451 | Amber Liquid | 49.5 |
| Dispersant 5 | 0 | 0 | 300 | 1.02 | 280 | Amber Paste | 35.3 |
| Dispersant 6 | 0 | 300 | 0 | 1.04 | 276 | Amber Liquid | 33.8 |
| Dispersant 7 | 29.3 | 229.3 | 0 | 0.75 | 242 | Amber liquid | 60.8 |
| Dispersant 8 | 29.3 | 229.3 | 0 | 1.5 | 241 | Amber Liquid | 35.4 |
| Dispersant 9 | 29.3 | 229.3 | 0 | 0.75 | 237 | Amber liquid | 22.1 |
| Dispersant 10 | 29.3 | 229.3 | 0 | 1.5 | 232 | Amber Liquid | 18.7 |
| Dispersant 11 | 0 | 0 | 300 | 1.05 | 279 | Amber Paste | 64.5 |
| Dispersant 12 | 0 | 300 | 0 | 0.98 | 278 | Amber liquid | 50.5 |
| Dispersant 13 | 43.2 | 225.9 | 0 | 0.75 | 241 | Amber Liquid | 34.5 |
| Dispersant 14 | 29.7 | 0 | 234.4 | 1.5 | 241 | Amber Liquid | 49.8 |
| Dispersant 15 | 29.7 | 0 | 234.4 | 1.5 | 236 | Amber Liquid | 35.6 |

Example 15

Test Method. The following formulation was mixed in a Henschel at 60° C. and then processed in a Brabender twin screw extruder apparatus at 25 rpm with the following barrel temperatures, (Barrel 1, 335° F., Barrel 2, 355° F., Barrel 3, 365° F.) and Die at 375° F. When the pressure at the die stabilizes, the average torque reading and output of material from the Brabender was recorded.

Extrusion Grade, Weatherable, Medium Impact, Siding Formulation

| Materials Used: | Source | Quantities (parts by wt) |
|---|---|---|
| Polyvinyl chloride | Oxy Vinyls 225F | 80 |
| Polyvinyl chloride | Oxy Vinyls 200F | 20 |
| Acrylic Modifier | LG Chemicals IM808A | 5.5 |
| Acrylic Process Aid | Rohm & Haas Paraloid K120ND | 1.5 |
| Acrylic Process Aid | Rohm & Haas Paraloid K175 | 0.6 |
| Calcium stearate | H.L. Blachford L-155 | 1.5 |
| Polyethylene wax | Honeywell AC-629A | 0.15 |
| Paraffin wax | Rheochem Rheolub 165 | 1.1 |
| Organo Tin stabilizer | Akzo T5201 | 1.7 |
| Calcium carbonate | Camel Fine ST | 30 |

Results

TABLE 2

| Dispersant | Die Pressure (Bar) | RPM | Material Throughput (lbs/hr) | % Throughput Increase |
|---|---|---|---|---|
| Control | 72 | 25 | 8.52 | — |
| 3 | 72 | 40 | 15.51 | 82 |
| 5 | 72 | 35 | 11.71 | 37.5 |
| 6 | 72 | 30 | 11.08 | 30 |
| 11 | 72 | 30 | 10.53 | 23.6 |
| 12 | 72 | 35 | 13.21 | 55 |

Example 16

Test Method. The following formulation was mixed in a Henschel at 60° C. and then processed in a Brabender twin screw extruder apparatus at 25 rpm with the following barrel temperatures, (Barrel 1, 335° F., Barrel 2, 355° F., Barrel 3, 365° F.) and Die at 375° F. When the pressure at the die stabilizes, the average torque reading and output of material from the Brabender was recorded.

Extrusion Grade, Weatherable, Medium Impact, Siding Formulation

| Materials Used: | Source | Quantities (parts by wt) |
|---|---|---|
| Polyvinyl chloride | Oxy Vinyls 220F | 100 |
| Acrylic Modifier | Paraloid KM348 | 5.5 |
| Acrylic Process Aid | Rohm & Haas Paraloid K120ND | 1.5 |
| Acrylic Process Aid | Rohm & Haas Paraloid K175 | 0.6 |
| Calcium stearate | Ferro15 | 1.5 |
| Polyethylene wax | Honeywell AC-629A | 0.15 |
| Paraffin wax | Rheochem Rheolub 165 | 1.1 |
| Organo Tin stabilizer | Mark 1900 | 1.7 |
| Calcium carbonate | Camel Fine ST | 30 |

Each dispersant (Examples 1-14) is then tested by addition to the above control formulations. Level of addition was set at 2% dispersant/agent on weight of the filler. Therefore, for the formulation containing 30 parts of Calcium Carbonate, 0.6 parts of dispersant is used. Each test formulation is then run through the extruder using the same barrel temperatures but the rpm is increased until the die pressure is matched and constant to the original control formulation die pressure. The average torque reading and throughput rates of material are recorded.

Results

TABLE 3

| Dispersant | Die Pressure (Bar) | RPM | Material Throughput (lbs/hr) | % Throughput Increase |
|---|---|---|---|---|
| Control | 55 | 25 | 8.13 | — |
| 3 | 55 | 45 | 13.04 | 72.5 |
| 5 | 55 | 50 | 13.42 | 67.6 |
| 7 | 55 | 45 | 11.94 | 53.5 |
| 8 | 55 | 45 | 11.86 | 52.4 |
| 9 | 55 | 45 | 12.59 | 61.9 |
| 10 | 55 | 45 | 12.09 | 55.3 |
| 13 | 55 | 45 | 12.08 | 55.3 |
| 14 | 55 | 50 | 13.53 | 73.9 |
| 15 | 55 | 50 | 13.60 | 74.7 |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, a vinyl chloride polymer and a compound of Formula (1):

$$H-[RC(=O)]_p-[A]_m-[B]_n-OM \qquad \text{Formula (1)}$$

wherein

R is $C_{1-36}$ hydrocarbylene group;

$[A]_m$ is an optionally branched oxy $(C_{7-20})$ alk(en)ylene carbonyl chain;

$[B]_n$ is an optionally branched oxy $(C_{1-6})$ alkylene carbonyl chain;

wherein p is 1, m is 1-10 and n is 1-10;

M is H, alkali or alkaline earth metal, amine, alkanolamine or quaternary ammonium salt; and wherein said particulate solid is present in an amount of at least 5 parts by weight per 100 parts by weight of said vinyl chloride polymer.

2. The composition of claim 1, wherein R is a $C_{8-20}$ hydrocarbylene group.

3. The composition of claim 1, wherein each A is independently a residue of compounds selected from the group consisting of ricinoleic acid, 12-hydroxystearic acid, 12-hydroxy dodecanoic acid, 5-hydroxy dodecanoic acid, 5-hydroxy decanoic acid, 4-hydroxy decanoic acid and 10-hydroxy undecanoic acid.

4. The composition of claim 1, wherein each B is independently the residue of compounds selected from the group consisting of caprolactone, valerolactone, glycolic acid, lactic acid, 5-hydroxy valeric acid and 6-hydroxy caproic acid.

5. The composition of claim 1, wherein the vinyl chloride polymer is a copolymer.

6. The composition of claim 1, wherein the vinyl chloride polymer comprises at least 90 wt. % repeating units from vinyl chloride.

7. The composition of claim 1, wherein the vinyl chloride polymer is vinyl chloride polymer which has had its halogen content increased in a post-polymerization reaction.

8. The composition of claim 1, wherein the particulate solid is selected from the group consisting of calcium carbonate, magnesium carbonate, magnesium hydroxide, alumina trihydrate, silica, alumina silicate, magnesium silicate, magnesium oxide, diatomaceous earth, hydrated silicates, calcium oxide, mica, talc, kaolin, and bentonite.

9. The composition of claim 8, wherein the particulate solid is calcium carbonate.

* * * * *